United States Patent
Kajisawa et al.

(10) Patent No.: US 12,434,724 B2
(45) Date of Patent: Oct. 7, 2025

(54) ELECTRIC POWER SOURCE APPARATUS

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Yuuta Kajisawa, Okazaki (JP); Yuji Fujita, Okazaki (JP); Kazuma Hasegawa, Anjo (JP); Yugo Nagashima, Anjo (JP); Takashi Koudai, Okazaki (JP); Daiki Inaba, Okazaki (JP); Masaharu Yamashita, Toyota (JP); Atsushi Satou, Miyoshi (JP); Yosuke Yamashita, Nagoya (JP); Kazuaki Iida, Toyota (JP); Hiroyuki Katayama, Toyota (JP); Shintaro Takayama, Toyota (JP); Toyohiro Hayashi, Kariya (JP); Takeshi Iwana, Kariya (JP); Hayaki Tanabe, Kariya (JP); Nobuyori Nakajima, Kariya (JP); Hiroki Tomizawa, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 230 days.

(21) Appl. No.: 18/340,330

(22) Filed: Jun. 23, 2023

(65) Prior Publication Data
US 2023/0415758 A1    Dec. 28, 2023

(30) Foreign Application Priority Data
Jun. 24, 2022  (JP) .................................. 2022-101932

(51) Int. Cl.
*B60W 50/023*  (2012.01)
*B60W 50/02*   (2012.01)
*B60W 50/14*   (2020.01)

(52) U.S. Cl.
CPC ...... *B60W 50/023* (2013.01); *B60W 50/0205* (2013.01); *B60W 50/14* (2013.01)

(58) Field of Classification Search
CPC . B60W 50/023; B60W 50/0205; B60W 50/14
(Continued)

(56) References Cited

U.S. PATENT DOCUMENTS 9,434,330 B2 *   9/2016  Lee .......................... B60L 15/20
2015/0120129 A1  4/2015  Lee
(Continued)

FOREIGN PATENT DOCUMENTS

JP    2019-140883 A    8/2019

OTHER PUBLICATIONS

Nov. 17, 2023 Search Report issued in European Patent Application No. 23180511.0.

*Primary Examiner* — Isaac G Smith
(74) *Attorney, Agent, or Firm* — Oliff PLC

(57) ABSTRACT

An electric power source apparatus includes a drive control apparatus and an auxiliary control apparatus. The drive control apparatus and the auxiliary control apparatus are configured to communicate with each other. When one of the drive control apparatus and the auxiliary control apparatus is a first control apparatus and the other of the drive control apparatus and the auxiliary control apparatus is a second control apparatus, the first control apparatus is configured to continue a function to communicate with the second control apparatus even when the first control apparatus is not able to normally communicate with the second control apparatus, and configured to execute communication with the second
(Continued)

control apparatus when the first control apparatus is put into a state where the first control apparatus is able to normally communicate with the second control apparatus.

6 Claims, 6 Drawing Sheets

(58) Field of Classification Search
USPC .......................................................... 701/31.6
See application file for complete search history.

(56) References Cited

U.S. PATENT DOCUMENTS

| | | |
|---|---|---|
| 2017/0057358 A1 | 3/2017 | Nakagawa et al. |
| 2019/0252909 A1 | 8/2019 | Sugiyama |
| 2019/0260324 A1 | 8/2019 | Kuramitsu et al. |
| 2022/0063414 A1* | 3/2022 | Kim ...................... B60L 3/0084 |
| 2022/0191106 A1* | 6/2022 | Kakiya ................. H04L 41/147 |
| 2024/0322734 A1* | 9/2024 | Sato ..................... B62D 5/0481 |

* cited by examiner

ELECTRIC POWER SOURCE APPARATUS

CROSS-REFERENCE TO RELATED APPLICATION

This application claims priority to Japanese Patent Application No. 2022-101932 filed on Jun. 24, 2022, incorporated herein by reference in its entirety.

BACKGROUND

1. Technical Field

The present disclosure relates to an electric power source apparatus.

2. Description of Related Art

For example, Japanese Unexamined Patent Application Publication No. 2019-140883 describes a system in which an auxiliary electric power source is connected to an EPS ECU. The EPS ECU is a control apparatus that executes a control to give assist torque to a turning wheel. In this system, the auxiliary electric power source is controlled by an electric power source control ECU. Further, in this system, the electric power source control ECU and the EPS ECU can communicate with each other.

SUMMARY

When the communication between the electric power source control ECU and the EPS ECU is disrupted, the communication is possibly stopped for avoiding the control from being executed based on incorrect data. However, in that case, there is fear that the auxiliary electric power source cannot be used.

An electric power source apparatus according to an aspect of the present disclosure includes a drive control apparatus and an auxiliary control apparatus that are equipped in a vehicle. The vehicle includes a main electric power source, an auxiliary electric power source, and a supply path. The auxiliary electric power source is configured to store electric power that is fed from the main electric power source. The supply path is configured to supply electric power from the main electric power source to an electronic device in the vehicle, and is configured to be opened or closed depending on the state of a start-up switch of the vehicle. The drive control apparatus is configured to control the state of a device equipped in the vehicle, using one of the main electric power source and the auxiliary electric power source as an electric power source. The auxiliary control apparatus is configured to control the state of the auxiliary electric power source. The drive control apparatus and the auxiliary control apparatus are configured to communicate with each other. When one of the drive control apparatus and the auxiliary control apparatus is a first control apparatus and the other of the drive control apparatus and the auxiliary control apparatus is a second control apparatus, the first control apparatus is configured to continue a function to communicate with the second control apparatus even when the first control apparatus is not able to normally communicate with the second control apparatus, and configured to execute communication with the second control apparatus when the first control apparatus is put into a state where the first control apparatus is able to normally communicate with the second control apparatus.

With the electric power source apparatus according to the aspect of the present disclosure, the first control apparatus continues the function to communicate with the second control apparatus, even when the first control apparatus is not able to normally communicate with the second control apparatus. Therefore, it is possible to execute the communication when the first control apparatus is put into the state where the first control apparatus is able to normally communicate with the second control apparatus. Therefore, in the case of the execution of the communication, it is possible to use the auxiliary electric power source while the drive control apparatus communicates with the auxiliary control apparatus.

In the electric power source apparatus according to the aspect of the present disclosure, the first control apparatus may be configured to execute a notification process of giving a notice indicating that the first control apparatus is not able to communicate with the second control apparatus, when the first control apparatus is not able to communicate with the second control apparatus. With the electric power source apparatus according to the aspect of the present disclosure, the first control apparatus gives the notice indicating that the first control apparatus is not able to communicate with the second control apparatus, when the first control apparatus is not able to communicate with the second control apparatus. Therefore, it is possible to cause a driver to perceive an abnormal situation where the communication cannot be performed.

In the electric power source apparatus according to the aspect of the present disclosure, the second control apparatus may be configured to start communication with the first control apparatus and execute an initial check, when the second control apparatus is started up. The first control apparatus may be configured to continue the notification process while the second control apparatus is executing the initial check, even when the communication with the second control apparatus is recovered.

As a reason why the communication with the second control apparatus is disrupted, there can be a temporary stop of the second control apparatus. In that case, the second control apparatus performs the initial check when the second control apparatus is started up. While the second control apparatus is performing the initial check, even when the communication between the first control apparatus and the second control apparatus is restarted, the communication cannot be always performed with high reliability. With the electric power source apparatus according to the aspect of the present disclosure, the notification process is continued while the second control apparatus is executing the initial check. Thereby, it is possible to avoid the driver from recognizing that the communication is normal, in a period during which the initial check is being performed.

In the electric power source apparatus according to the aspect of the present disclosure, the first control apparatus may be configured to terminate the notification process when the communication with the second control apparatus is recovered and the second control apparatus completes the initial check.

With the electric power source apparatus according to the aspect of the present disclosure, the notification process is terminated when the second control apparatus completes the initial check. Thereby, it is possible to cause the driver to perceive the recovery to the normal state.

In the electric power source apparatus according to the aspect of the present disclosure, the first control apparatus may include a storage apparatus. The first control apparatus may be configured to execute a retention process of retaining a last communication content in the storage apparatus and a process of controlling the state of the device equipped in the vehicle based on a content retained in the retention process, when the first control apparatus is not able to communicate with the second control apparatus.

With the electric power source apparatus according to the aspect of the present disclosure, when the first control apparatus is not able to communicate with the second control apparatus, the first control apparatus controls the state of the device based on the last communication content. There is a high possibility that the last communication content is similar to the actual state, and therefore it is possible to perform the control while reflecting the actual state as much as possible.

In the electric power source apparatus according to the aspect of the present disclosure, the first control apparatus may be configured to execute an update process of updating a content stored in the storage apparatus, when the communication with the second control apparatus is restarted.

With the electric power source apparatus according to the aspect of the present disclosure, the first control apparatus can set the content stored in the storage apparatus to the latest content, by updating the content stored in the storage apparatus when the communication is restarted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment will be described below with reference to the drawings.

Premise Configuration

Figure 1:
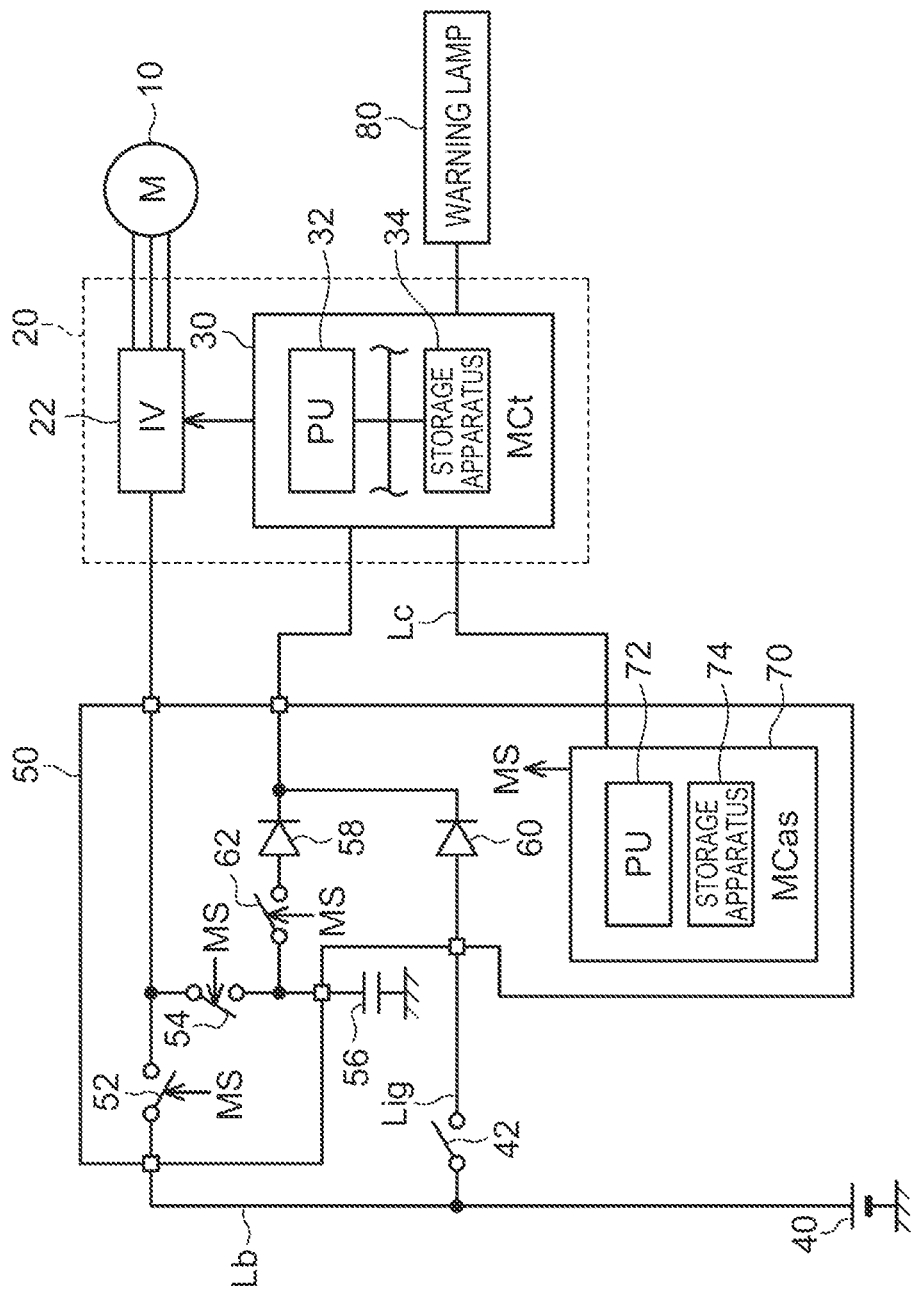
FIG. 1 is a block diagram showing a steering control system according to an embodiment.

FIG. 1 shows the configuration of a steering control system of a vehicle according to the embodiment. In the embodiment, a so-called steer-by-wire system in which a transmission path for dynamic power between a steering wheel and a turning wheel is shut off is assumed as a steering system.

A turning motor 10 is included in a turning actuator for turning the turning wheel. Voltage is applied to a terminal of the turning motor 10, by a turning control apparatus 20. Specifically, the turning control apparatus 20 includes an inverter 22. The output voltage of the inverter 22 is applied to the terminal of the turning motor 10.

The turning control apparatus 20 includes a turning microcomputer 30. The turning microcomputer 30 operates the inverter 22 to control a control amount for the turning motor 10 that is a control object. The turning microcomputer 30 includes a PU 32 and a storage apparatus 34. The PU 32 is a software processing apparatus that includes at least one processing unit of a CPU, a GPU and a TPU. The storage apparatus 34 stores programs that are executed by the PU 32. The turning control apparatus 20 is an example of the drive control apparatus and the first control apparatus.

An auxiliary control apparatus 50 is an apparatus that controls the state of an auxiliary electric power source 56 that is a control object. The auxiliary electric power source 56 is an electric storage apparatus that stores the electric charge from a battery 40. For example, the auxiliary electric power source 56 may be a capacitor. The battery 40 is an example of the main electric power source. The auxiliary electric power source 56 is an example of the auxiliary electric power source.

The auxiliary control apparatus 50 includes a switching element 52 that connects or disconnects a main electric power source line Lb and the inverter 22. The auxiliary control apparatus 50 includes a switching element 54 that connects or disconnects the main electric power source line Lb and the auxiliary electric power source 56 through the switching element 52. The auxiliary control apparatus 50 includes a diode 58 that connects the auxiliary electric power source 56 and the turning microcomputer 30. The diode 58 is a rectifier element in which the anode is the positive electrode terminal side of the auxiliary electric power source 56 and the cathode is the turning microcomputer 30 side. The auxiliary control apparatus 50 includes a diode 60 that connects a start-up line Lig and the turning microcomputer 30. The diode 60 is a rectifier element in which the anode is the battery 40 side and the cathode is the turning microcomputer 30 side. The auxiliary control apparatus 50 includes a switching element 62 that connects or disconnects the anode side of the diode 58 and the auxiliary electric power source 56. The auxiliary control apparatus 50 is an example of the auxiliary control apparatus. The start-up line Lig is an example of the supply path.

The auxiliary control apparatus 50 includes an auxiliary microcomputer 70. The auxiliary microcomputer 70 detects the voltage and electric current of the auxiliary electric power source 56, and monitors the state of the auxiliary electric power source 56. The auxiliary microcomputer 70 controls the supply of electric power from the battery 40 to the inverter 22, by performing an opening-closing operation of the switching element 52. Further, the auxiliary microcomputer 70 controls the transfer of electric power between the auxiliary electric power source 56 and the inverter 22, by performing an opening-closing operation of the switching element 54. Further, the auxiliary microcomputer 70 controls the supply of electric power from the auxiliary electric power source 56 to the turning microcomputer 30, by performing an opening-closing operation of the switching element 62.

The auxiliary microcomputer 70 includes a PU 72 and a storage apparatus 74.

Communication Process at Time of Use of Auxiliary Electric Power Source 56

Figure 2:
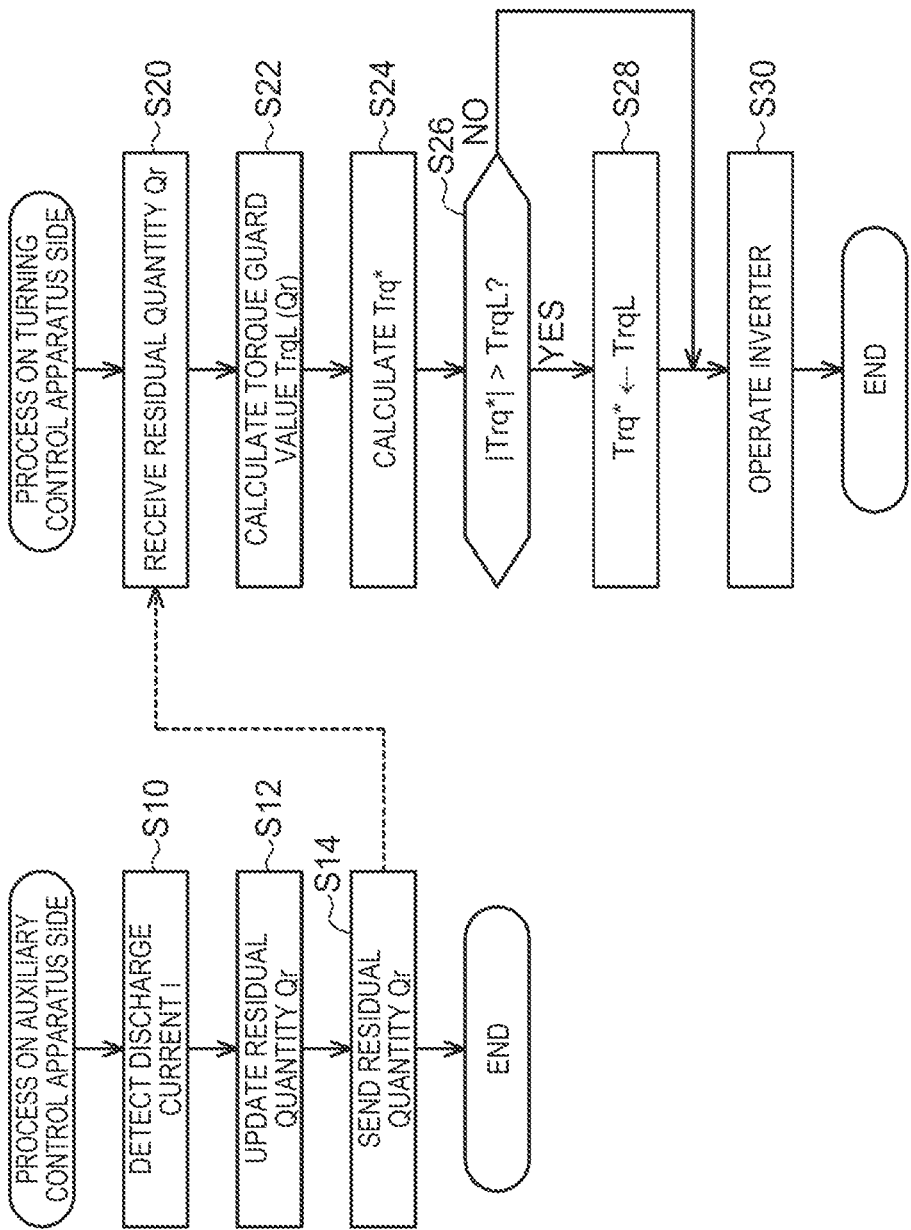
FIG. 2 is a flowchart showing a procedure of a communication process according to the embodiment.

FIG. 2 shows a procedure of processes in the turning microcomputer 30 and the auxiliary microcomputer 70 when the turning microcomputer 30 uses the auxiliary electric power source 56. A process shown in FIG. 2 is realized when the PU 32 repeatedly executes a program stored in the storage apparatus 34 with a predetermined period. Further, a process shown in FIG. 2 is realized when the PU 72 repeatedly executes a program stored in the storage apparatus 74 with a predetermined period. Hereinafter, step numbers for the processes are expressed as numerals in which "S" is put as the heading character.

In a sequence of processes shown in FIG. 2, first, the PU 72 of the auxiliary microcomputer 70 detects a discharge current I of the auxiliary electric power source 56 (S10). As for the discharge current I, a positive value indicates that discharge is being performed, and a negative value indicates that charge is being performed. Next, the PU 72 updates a residual quantity Qr of the auxiliary electric power source 56, based on an integration process of the discharge current I (S12). The PU 72 performs a reduction correction of the residual quantity Qr by a value resulting from multiplying the discharge current I by a period T of a sequence of processes in FIG. 2. Next, the PU 72 sends the residual quantity Qr updated in the process of S12 (S14). When the process of S14 is completed, the PU 72 once ends the process that is of the processes shown in FIG. 2 and that is executed by the auxiliary microcomputer 70.

Meanwhile, the PU 32 of the turning microcomputer 30 receives the residual quantity Qr (S20). Next, depending on the residual quantity Qr, the PU 32 calculates a torque guard value TraL that is an upper guard value of the magnitude of the torque of the turning motor 10 (S22). The PU 32 sets the torque guard value TrqL when the residual quantity Qr is large, to a value equal to or more than the torque guard value TrqL when the residual quantity Qr is small. As this process, the PU 32 may perform a map computation of the torque guard value TrqL in a state where map data is stored in the storage apparatus 34. The map data is data in which an input variable is the residual quantity Qr and an output variable is the torque guard value TrqL.

The map data is combination data having discrete values of the input variable and values of the output variable that respectively correspond to the values of the input variable. Further, as the map computation, for example, when the value of the input variable coincides with one of the values of the input variable in the map data, a corresponding value of the output variable in the map data may be set as the computation result. Further, as the map computation, when the value of the input variable does not coincide with any of the values of the input variable in the map data, a value obtained by the interpolation with a plurality of values of the output variable that are included in the map data may be set as the computation result. Instead of this, as the map computation, when the value of the input variable does not coincide with any of the values of the input variable in the map data as described above, a value of the output variable that corresponds to a value closest to the actual value of the input variable among the plurality of value of the input variable that is included in the map data may be set as the computation result.

Next, the PU 32 calculates a target torque Trq* (S24). For example, the PU 32 may calculate the target torque Trq* depending on the torque that is given to the steering wheel by a driver. Further, for example, the PU 32 may calculate the target torque Trq* depending on the request for a control to assist the steering of the vehicle.

Next, the PU 32 determines whether the absolute value of the target torque Trq* of the turning motor 10 is larger than the torque guard value TrqL (S26). When the PU 32 determines that the absolute value of the target torque Trq* of the turning motor 10 is larger than the torque guard value TrqL (S26: YES), the PU 32 sets the magnitude of the target torque Trq* to the torque guard value TrqL (S28). When the process of S28 is completed or when the negative determination is made in the process of S26, the PU 32 operates the inverter 22, to control the torque of the turning motor 10 such that the torque of the turning motor 10 gets close to the target torque Trq* (S30).

When the process of S30 is completed, the PU 32 once ends a sequence of processes shown in FIG. 2.

Process in Auxiliary Microcomputer 70

Figure 3:
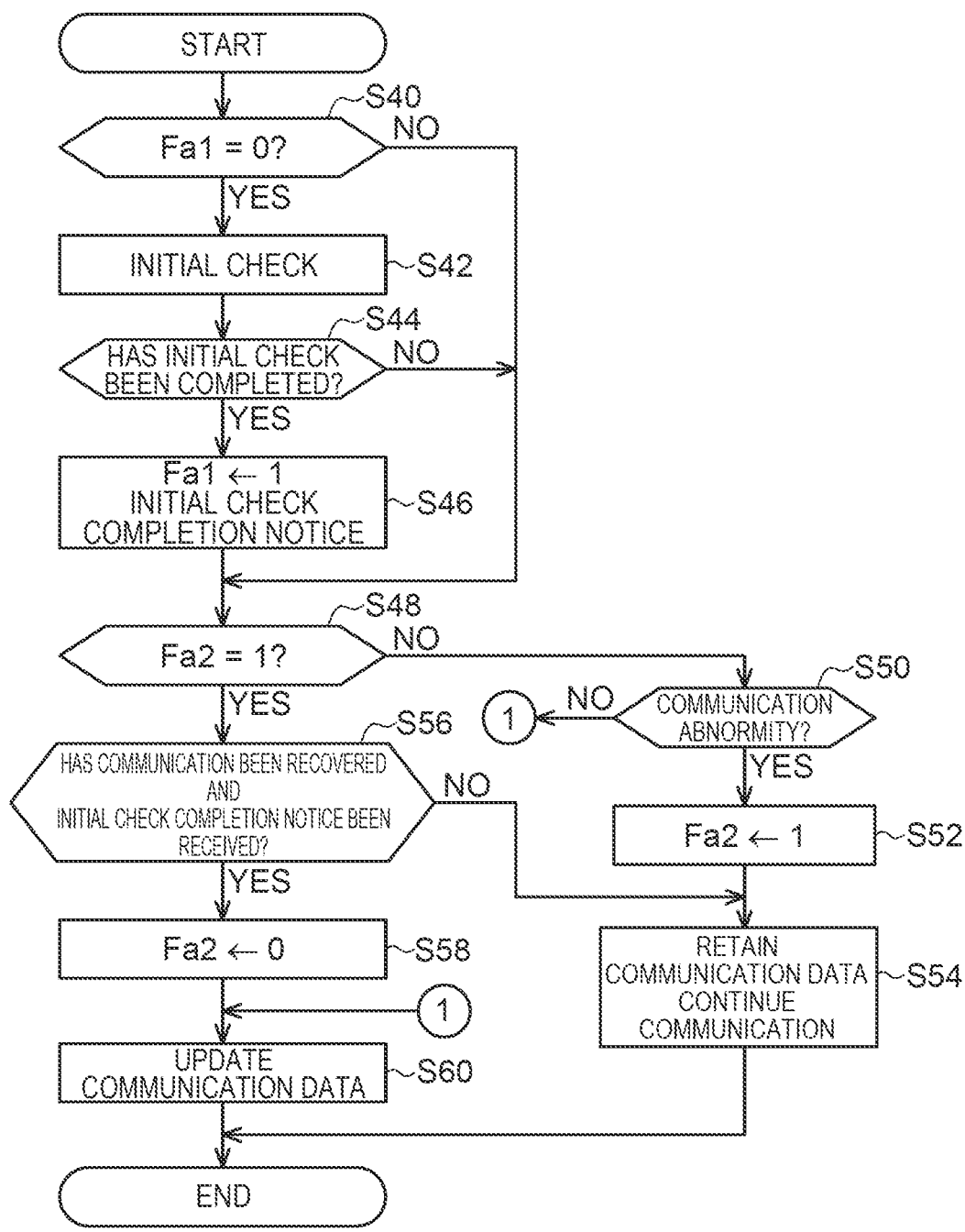
FIG. 3 is a flowchart showing a procedure of a process that is executed by an auxiliary microcomputer according to the embodiment.

FIG. 3 shows a procedure of a process that is executed by the PU 72 of the auxiliary microcomputer 70. The process shown in FIG. 3 is realized when the PU 72 repeatedly executes a program stored in the storage apparatus 74 with a predetermined period, for example.

In a sequence of processes shown in FIG. 3, first, the PU 72 determines whether a check completion flag Fa1 is "0" (S40). When the check completion flag Fa1 is "1", the check completion flag Fa1 indicates that an initial check has been completed after the start-up of the auxiliary microcomputer 70. Further, when the check completion flag Fa1 is "0", the check completion flag Fa1 indicates that the initial check has not been completed after the start-up of the auxiliary microcomputer 70. At the time of the start-up of the auxiliary microcomputer 70, the check completion flag Fa1 is set to "0" by an initializing process. When the PU 72 determines that the check completion flag Fa1 is "0" (S40: YES), the PU 72 executes the initial check (S42). The initial check includes the check of a circuit portion of the auxiliary control apparatus 50 based on whether the voltage of the battery 40 is applied to a predetermined spot of the auxiliary control apparatus 50, for example. Further, the initial check includes the check of various states in the auxiliary microcomputer 70. The check of the various states includes the check of the value of the data stored in the storage apparatus 74.

Then, the PU 72 determines whether the initial check has been completed (S44). When the PU 72 determines that the initial check has been completed (S44: YES), the PU 72 substitutes "1" into the check completion flag Fa1, and gives a notice indicating that the initial check has been completed, to the turning microcomputer 30, through a communication line Lc (S46).

When the process of S46 is completed or when the negative determination is made in the process of S40 or the process of S44, the PU 72 determines whether a communication abnormity flag Fa2 is "1" (S48). When the communication abnormity flag Fa2 is "1", the communication abnormity flag Fa2 indicates an abnormal situation where the communication with the turning microcomputer 30 cannot be performed. When the communication abnormity flag Fa2 is "0", the communication abnormity flag Fa2 indicates that the communication with the turning microcomputer 30 can be normally performed.

When the PU 72 determines that the communication abnormity flag Fa2 is "0" (S48: NO), the PU 72 determines whether the communication with the turning microcomputer 30 cannot be performed because of the abnormal situation (S50). When the PU 72 makes the determination of the abnormal situation (S50: YES), the PU 72 substitutes "1" into the communication abnormity flag Fa2 (S52). Then, the PU 72 continues the communication (S54). That is, the PU 72 does not stop the communication, and keeps a state where the communication can be started anytime when data is sent from the turning microcomputer 30. When the PU 72 makes the positive determination in the process of S50 because of the transition from a state where the communication can be performed to a state where the communication cannot be performed, the PU 72 retains, in the storage apparatus 74, the data received from the turning microcomputer 30 immediately before the communication is disrupted. The process of S54 is an example of "continue a function to communicate".

On the other hand, when the PU 72 determines that the communication abnormity flag Fa2 is "1" (S48: YES), the PU 72 determines whether the logical product of a condition (A) and a condition (B) described below is true (S56).

Condition (A): a condition that the state where the communication with the turning microcomputer 30 can be performed has been recovered.

Condition (B): a condition that the notice indicating that the initial check has been completed has been received from the turning microcomputer 30.

When the PU 72 determines that the logical product is false (S56: NO), the PU 72 transitions to the process of S54. On the other hand, when the PU 72 determines that the logical product is true (S56: YES), the PU 72 substitutes "0" into the communication abnormity flag Fa2 (S58). When the process of S58 is completed or when the negative determination is made in the process of S50, the PU 72 updates the data stored in the storage apparatus 74, using the data obtained by each communication with the turning microcomputer 30 (S60).

When the process of S54 or the process of S60 is completed, the PU 72 once ends a sequence of processes shown in FIG. 3.

Process in Turning Microcomputer 30

Figure 4:
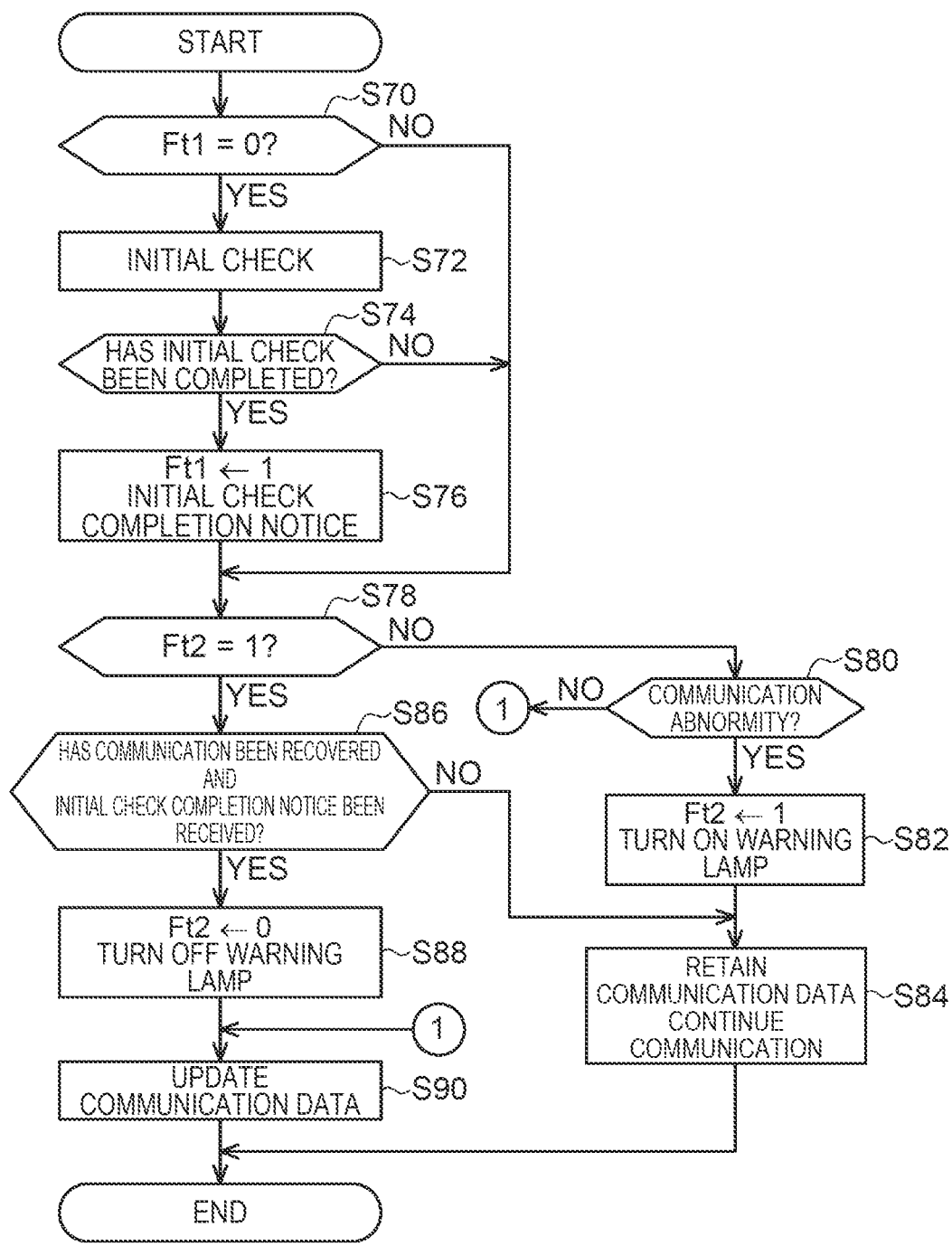
FIG. 4 is a flowchart showing a procedure of a process that is executed by a turning microcomputer according to the embodiment.

FIG. 4 shows a procedure of a process that is executed by the PU 32 of the turning microcomputer 30. The process shown in FIG. 4 is realized when the PU 32 repeatedly executes a program stored in the storage apparatus 34 with a predetermined period, for example.

In a sequence of processes shown in FIG. 4, first, the PU 32 determines whether a check completion flag Ft1 is "0" (S70). When the check completion flag Ft1 is "1", the check completion flag Ft1 indicates that the initial check has been completed after the start-up of the turning microcomputer 30. Further, when the check completion flag Ft1 is "0", the check completion flag Ft1 indicates that the initial check has not been completed after the start-up of the turning microcomputer 30. At the time of the start-up of the turning microcomputer 30, the check completion flag Ft1 is set to "0" by an initializing process. When the PU 32 determines that the check completion flag Ft1 is "0" (S70: YES), the PU 32 executes an initial check (S72). The initial check includes the check of a circuit portion of the turning control apparatus 20 based on whether the voltage of the battery 40 is applied to a predetermined spot of the inverter 22, for example. Further, the initial check includes the check of various states in the turning microcomputer 30. The check of the various states includes the check of the value of the data stored in the storage apparatus 34.

Then, the PU 32 determines whether the initial check has been completed (S74). When the PU 32 determines that the initial check has been completed (S74: YES), the PU 32 substitutes "1" into the check completion flag Ft1, and gives a notice indicating that the initial check has been completed, to the auxiliary microcomputer 70 (S76).

When the process of S76 is completed or when the negative determination is made in the process of S70 or the process of S74, the PU 32 determines whether a communication abnormity flag Ft2 is "1" (S78). When the communication abnormity flag Ft2 is "1", the communication abnormity flag Ft2 indicates an abnormal situation where the communication with the auxiliary microcomputer 70 cannot be performed. When the communication abnormity flag Ft2 is "0", the communication abnormity flag Ft2 indicates that the communication with the auxiliary microcomputer 70 can be normally performed.

When the PU 32 determines that the communication abnormity flag Ft2 is "0" (S78: NO), the PU 32 determines whether the communication with the auxiliary microcomputer 70 cannot be performed because of the abnormal situation (S80). When the PU 32 makes the determination of the abnormal situation where the communication cannot be performed (S80: YES), the PU 32 substitutes "1" into the communication abnormity flag Ft2, and turns on a warning lamp 80 shown in FIG. 1 (S82). Then, the PU 32 continues the communication (S84). That is, the PU 32 does not stop the communication, and keeps a state where the communication can be started anytime when data is sent from the auxiliary microcomputer 70. When the PU 32 makes the positive determination in the process of S80 because of the transition from a state where the communication can be performed to a state where the communication cannot be performed, the PU 32 retains, in the storage apparatus 34, the data received from the auxiliary microcomputer 70 immediately before the communication is disrupted. The process of S82 is an example of the notification process. The process of S84 is an example of "continue a function to communicate" and the retention process.

On the other hand, when the PU 32 determines that the communication abnormity flag Ft2 is "1" (S78: YES), the PU 32 determines whether the logical product of a condition (C) and a condition (D) described below is true (S86).

Condition (C): a condition that the state where the communication with the auxiliary microcomputer 70 can be performed has been recovered.

Condition (D): a condition that the notice indicating that the initial check has been completed has been received from the auxiliary microcomputer 70.

When the PU 32 determines that the logical product is false (S86: NO), the PU 32 transitions to the process of S84. On the other hand, when the PU 32 determines that the logical product is true (S86: YES), the PU 32 substitutes "0" into the communication abnormity flag Ft2, and turns off the warning lamp 80 (S88). When the process of S88 is completed or when the negative determination is made in the process of S80, the PU 32 updates the data stored in the storage apparatus 34, using the data obtained by each communication with the auxiliary microcomputer 70 (S90).

When the process of S84 or the process of S90 is completed, the PU 32 once ends a sequence of processes shown in FIG. 4. The operation and effect of the embodiment will be described.

Figure 5:
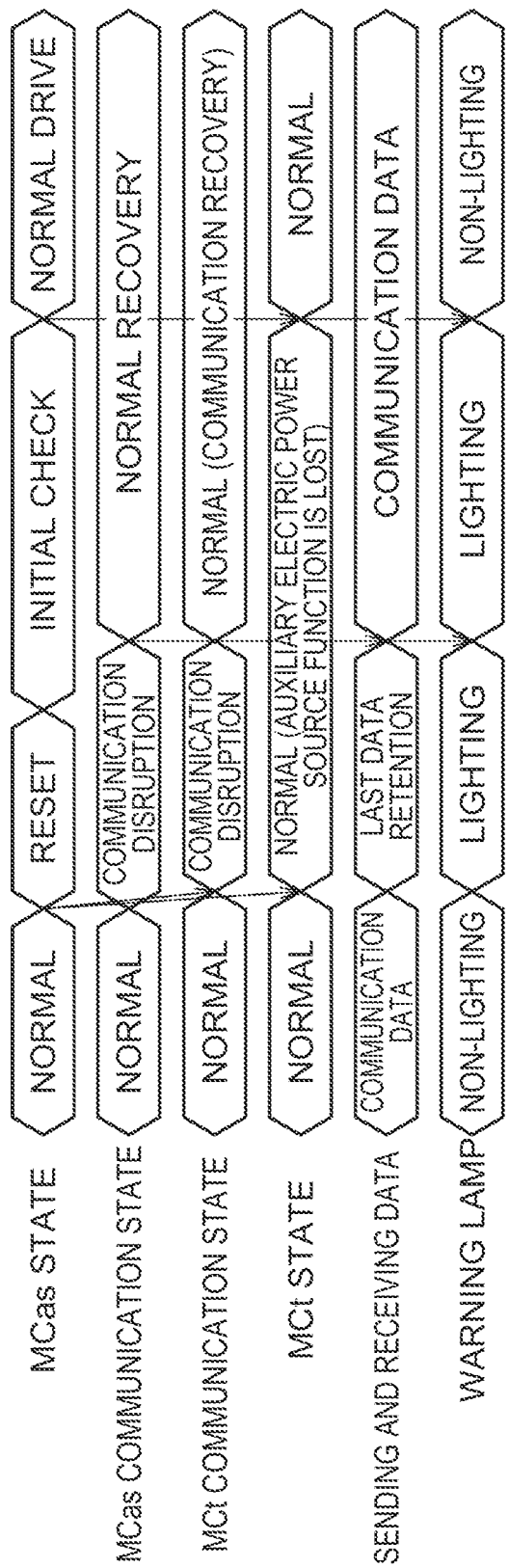
FIG. 5 is a time chart exemplifying the communication process according to the embodiment.

FIG. 5 shows the respective states of the turning microcomputer 30 and the auxiliary microcomputer 70. In FIG. 5, the turning microcomputer 30 is described as "MCt", and the auxiliary microcomputer 70 is described as "MCas".

The turning microcomputer 30 and the auxiliary microcomputer 70 communicate with each other after the start-up. For example, as shown in FIG. 5, when the auxiliary microcomputer 70 is reset, the communication is disrupted. In that case, the PU 32 of the turning microcomputer 30 turns on the warning lamp 80, and thereby gives, to the driver, a notice indicating that the auxiliary electric power source 56 cannot be normally used when the electric power of the battery 40 is shut off.

When the communication is disrupted, it is possible that the communication is shut off for avoiding the control from being performed based on incorrect data due to the superimposition of noise on the communication line Lc. However, in that case, the communication cannot be restarted until a start-up switch 42 is once put into an opening state and thereafter is put into a closing state again. Accordingly, the auxiliary electric power source 56 cannot be normally used until the start-up switch 42 is once put into the opening state and thereafter is put into the closing state again.

Hence, the turning microcomputer 30 continues the communication with the auxiliary microcomputer 70. On the other hand, when the auxiliary microcomputer 70 recovers from the reset, the auxiliary microcomputer 70 starts the initial check and restarts the communication with the turning microcomputer 30. In this way, since the PU 32 of the turning microcomputer 30 does not shut off the communication, the communication with the auxiliary microcomputer 70 can be restarted when the auxiliary microcomputer 70 recovers from the reset.

Figure 6:
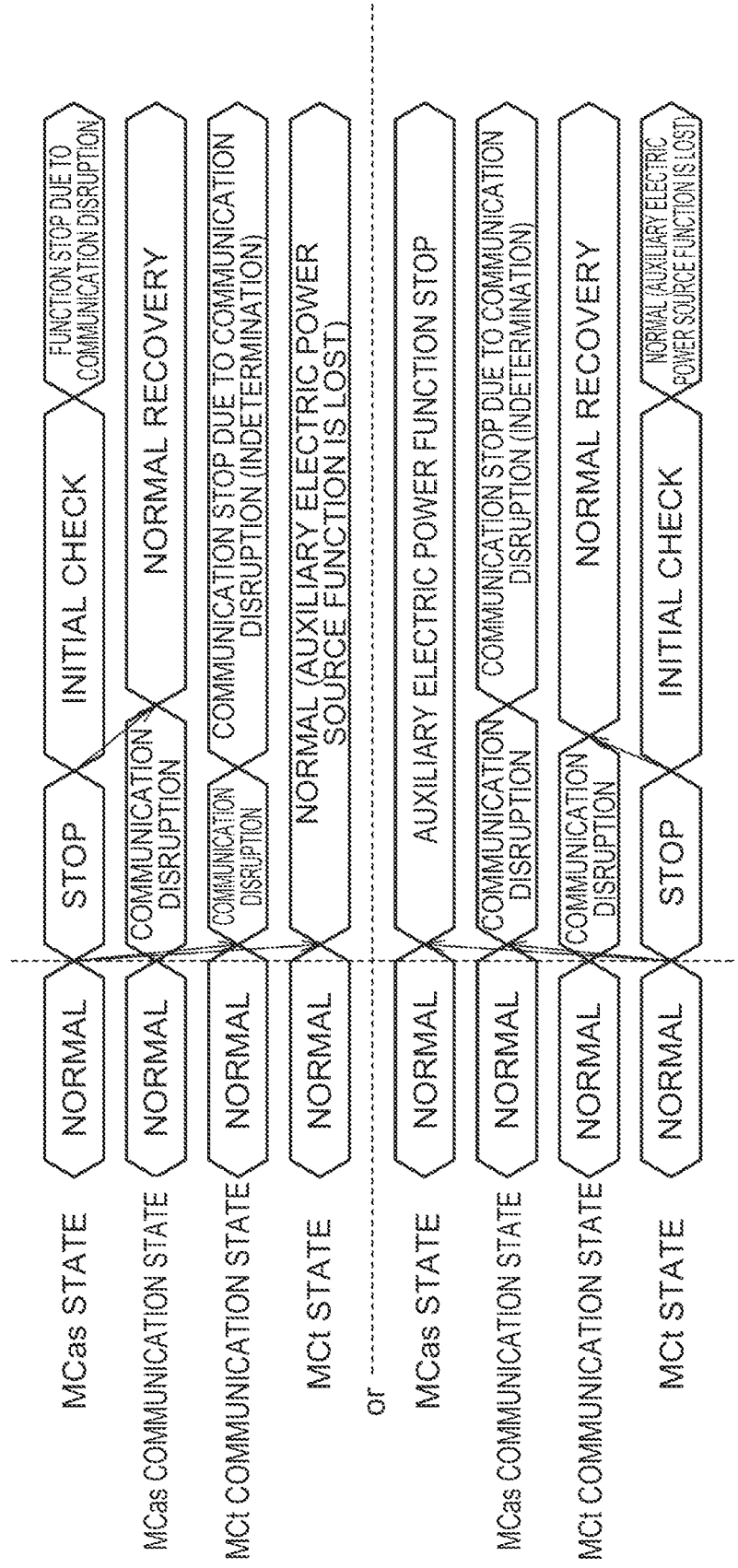
FIG. 6 is a time chart exemplifying a communication process according to a comparative example of the embodiment.

In contrast, in the case where the communication is shut off when the communication disrupted, the communication cannot be restarted despite in a state where the communication may be restarted, as shown in FIG. 6. That is, for example, in the case where the auxiliary microcomputer 70 is stopped, the auxiliary microcomputer 70 is in a state where the communication can be performed, when the auxiliary microcomputer 70 recovers. However, when the turning microcomputer 30 shuts off the communication after the communication disruption, the communication cannot be restarted between the turning microcomputer 30 and the auxiliary microcomputer 70. Further, for example, in the case where the turning microcomputer 30 is stopped, the turning microcomputer 30 is in a state where the communication can be performed, when the turning microcomputer 30 recovers. However, when the auxiliary microcomputer 70 shuts off the communication after the communication disruption, the communication cannot be restarted between the turning microcomputer 30 and the auxiliary microcomputer 70.

Back to FIG. 5, even when the communication is restarted, the PU 32 of the turning microcomputer 30 continues the lighting of the warning lamp 80, until the PU 72 of the auxiliary microcomputer 70 completes the initial check. It is not confirmed that the auxiliary control apparatus 50 functions normally, until the initial check is completed. Therefore, it is not confirmed that a control for using the auxiliary electric power source 56 can be normally executed. Therefore, the PU 32 continues the lighting of the warning lamp 80. Thereby, it is possible to cause the driver to know that the control for using the auxiliary electric power source 56 cannot be normally executed.

Further, when the communication with the auxiliary microcomputer 70 can not be performed, the PU 32 retains the content of the last communication with the auxiliary microcomputer 70, in the storage apparatus 34. This communication content includes information about the residual quantity Qr received in the process of S20 in FIG. 2. Therefore, for example, when the communication with the auxiliary microcomputer 70 is disrupted in an abnormal situation where the electric power supply from the battery 40 is shut off, the PU 32 executes the processes of S22 to S30, based on the residual quantity Qr immediately before the communication is disrupted. The residual quantity Qr immediately before the communication is disrupted is likely to be a value close to the actual residual quantity of the auxiliary electric power source 56. Accordingly, it is possible to execute the processes of S22 to S30 more appropriately, compared to a case where a default value is used as the residual quantity Qr, for example.

Incidentally, the case where the positive determination is made in the process of S50 or the process of S80 is not limited to the case where the communication is disrupted after the establishment of the communication. For example, in the case where there is a gap in start-up timing between the turning microcomputer 30 and the auxiliary microcomputer 70 after the start-up switch 42 is switched from the opening state to the closing state, the positive determination can be made in the process of S50 or the process of S80. That is, for example, in the case where the start-up of the auxiliary microcomputer 70 is delayed, the PU 32 of the turning microcomputer 30 makes the positive determination in the process of S80. Then, in the case where the communication is shut off because of the positive determination in the process of S80, the communication between the auxiliary microcomputer 70 and the turning microcomputer 30 cannot be performed until the start-up switch 42 is once switched to the opening state and thereafter is switched to the closing state again. Accordingly, there is fear that the auxiliary electric power source 56 cannot be normally used.

Other Embodiments

The embodiment can be carried out while being modified as described below. The embodiment and the following modifications can be carried out while being combined with each other, as long as there is no technical inconsistency.

Notification Process

The notification process is not limited to the process of turning on the warning lamp 80. For example, a process of emitting warning sound may be adopted. Furthermore, for example, a process of displaying a character or a particular figure on a display apparatus may be adopted.

In the above embodiment, the warning lamp 80 is turned off after the completion of the initial check, but the applicable embodiment is not limited to this. In the above embodiment, the auxiliary control apparatus 50 does not have the function to execute the notification process, but the applicable embodiment is not limited to this.

Retention Process

In the above embodiment, the last communication content is retained until the communication is restarted, but the applicable embodiment is not limited to this. For example, for the residual quantity Qr, a decrease correction may be performed when the continuation time of a control using the auxiliary electric power source 56 is equal to or more than a predetermined time.

Auxiliary Electric Power Source

The auxiliary electric power source is not limited to the capacitor, and may be a secondary battery, for example.

Drive Control Apparatus

In the above embodiment, the turning control apparatus 20 has been exemplified as the drive control apparatus, but the applicable embodiment has not been limited to this. For example, a steering control apparatus that operates a reaction force actuator that gives reaction force to the steering wheel may be adopted. Further, for example, the drive control apparatus may be configured by the steering control apparatus and the turning control apparatus in cooperation. In that case, for example, only the steering control apparatus may be allowed to communicate with the auxiliary control apparatus 50. Further, in that case, the turning control apparatus 20 may play a role in operating the warning lamp 80. In other words, the notification process may be executed by the turning control apparatus 20.

Further, for example, a control apparatus that controls a lock mechanism that restricts the rotation of the steering wheel may be adopted. Further, for example, a shift control apparatus that switches the state of a transmission of the vehicle may be adopted. Further, for example, a control apparatus that controls the braking force of the vehicle by operating a brake actuator may be adopted.

The drive control apparatus is not limited to an apparatus that includes the PU 32 and the storage apparatus 34 and that executes software processing. For example, a dedicated hardware circuit (for example, an ASIC or the like) that performs hardware processing for at least a part of the software processing in the above embodiment may be included. That is, the drive control apparatus may have any configuration of the following (a) to (c).

(a) A processing apparatus that executes all of the above processes in accordance with a program and a program storing apparatus that stores the program, as exemplified by a ROM, are included.

(b) A processing apparatus that executes some of the above processes in accordance with a program, a program storing apparatus, and a dedicated hardware circuit that executes the remaining processes are included.

(c) A dedicated hardware circuit that executes all of the above processes is included.

A plurality of software processing circuits each of which includes a processing apparatus and a program storing apparatus may be included, and a plurality of dedicated hardware circuits may be included. That is, the above processes may be executed by a processing circuit including at least one of a single or a plurality of software processing circuits and a single or a plurality of dedicated hardware circuits.

Auxiliary Control Apparatus

The auxiliary control apparatus 50 is not limited to an apparatus that includes the PU 72 and the storage apparatus 74 and that executes software processing. For example, a dedicated hardware circuit (for example, an ASIC or the like) that performs hardware processing for at least a part of the software processing in the above embodiment may be included. That is, the auxiliary control apparatus may have any configuration of the following (a) to (c).

(a) A processing apparatus that executes all of the above processes in accordance with a program and a program storing apparatus that stores the program, as exemplified by a ROM, are included.

(b) A processing apparatus that executes some of the above processes in accordance with a program, a program storing apparatus, and a dedicated hardware circuit that executes the remaining processes are included.

(c) A dedicated hardware circuit that executes all of the above processes is included.

A plurality of software processing circuits each of which includes a processing apparatus and a program storing apparatus may be included, and a plurality of dedicated hardware circuits may be included. That is, the above processes may be executed by a processing circuit including at least one of a single or a plurality of software processing circuits and a single or a plurality of dedicated hardware circuits.

Steering System

In the above embodiment, the steer-by-wire system has been exemplified, but the applicable embodiment is not limited to this. For example, a steering system in which the dynamic power transmission between the steering wheel and the turning wheel is executed may be adopted.

What is claimed is:

1. An electric power source apparatus comprising a turning control apparatus and an auxiliary control apparatus that are disposed in a vehicle, wherein:

the vehicle includes a main electric power source, an auxiliary electric power source configured to store electric power that is supplied to the auxiliary electric power source from the main electric power source, and a supply path configured to supply electric power from the main electric power source to a turning motor that turns a turning wheel of the vehicle, and configured to be opened or closed depending on a state of a start-up switch of the vehicle;

the turning control apparatus is configured to control a control amount of the turning motor disposed in the vehicle, using one of the main electric power source and the auxiliary electric power source as an electric power source;

the auxiliary control apparatus is configured to control a state of the auxiliary electric power source;

the turning control apparatus and the auxiliary control apparatus are configured to communicate with each other; and the turning control apparatus is (i) configured to stay in a state in which the turning control apparatus can start to communicate with the auxiliary control apparatus even when the auxiliary control apparatus is being reset which causes communication to be disrupted between the turning control apparatus and the auxiliary control apparatus, and (ii) configured to execute communication with the auxiliary control apparatus after the auxiliary control apparatus recovers from the reset.

2. The electric power source apparatus according to claim 1, wherein the turning control apparatus is configured to execute a notification process of giving a notice indicating that the communication is disrupted between the turning control apparatus and the auxiliary control apparatus, when the communication is disrupted between the turning control apparatus and the auxiliary control apparatus.

3. The electric power source apparatus according to claim 2, wherein:

the auxiliary control apparatus is configured to start the communication with the turning control apparatus and execute an initial check, when the auxiliary control apparatus recovers from the reset; and the turning control apparatus is configured to continue the notification process while the auxiliary control apparatus is executing the initial check, even though the communication with the auxiliary control apparatus has been started.

4. The electric power source apparatus according to claim 3, wherein the turning control apparatus is configured to terminate the notification process when the auxiliary control apparatus completes the initial check.

5. The electric power source apparatus according to claim 1, wherein:

the turning control apparatus includes a storage apparatus; and the turning control apparatus is configured to execute a retention process of storing a last communication content between the turning control apparatus and the auxiliary control apparatus in the storage apparatus and a process of controlling the control amount of the turning motor based on the last communication content stored in the retention process, when the communication is disrupted between the turning control apparatus and the auxiliary control apparatus.

6. The electric power source apparatus according to claim 5, wherein the turning control apparatus is configured to execute an update process of updating the content stored in the storage apparatus, when the communication between the turning control apparatus and the auxiliary control apparatus is restarted after having been disrupted.

\* \* \* \* \*